United States Patent
Lee et al.

(10) Patent No.: US 12,240,385 B2
(45) Date of Patent: Mar. 4, 2025

(54) FRONT IMAGE GENERATION DEVICE FOR HEAVY EQUIPMENT

(71) Applicants: WISE AUTOMOTIVE CORPORATION, Seoul (KR); HD HYUNDAI INFRACORE CO., LTD., Incheon (KR)

(72) Inventors: Jungpyo Lee, Seoul (KR); Jaehong Park, Seoul (KR); Sanghoon Lee, Incheon (KR); Kwangseok Park, Incheon (KR)

(73) Assignees: WISE AUTOMOTIVE CORPORATION, Seoul (KR); HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 18/274,165

(22) PCT Filed: Jan. 25, 2022

(86) PCT No.: PCT/KR2022/001263
§ 371 (c)(1),
(2) Date: Jul. 25, 2023

(87) PCT Pub. No.: WO2022/158935
PCT Pub. Date: Jul. 28, 2022

(65) Prior Publication Data
US 2025/0001939 A1  Jan. 2, 2025

(30) Foreign Application Priority Data
Jan. 25, 2021  (KR) ........................ 10-2021-0010285

(51) Int. Cl.
*B60R 1/24* (2022.01)
*G06T 3/40* (2024.01)
(Continued)

(52) U.S. Cl.
CPC .................. *B60R 1/24* (2022.01); *G06T 3/40* (2013.01); *G06T 15/503* (2013.01); *G06T 15/60* (2013.01);
(Continued)

(58) Field of Classification Search
CPC . B60R 1/23; B60R 2300/20; B60R 2300/105; B60R 2300/303;
(Continued)

(56) References Cited

U.S. PATENT DOCUMENTS 9,767,693 B2 * 9/2017 Lee .......................... G08G 1/166
10,949,678 B2 * 3/2021 Boving ................... E02F 9/261
(Continued)

FOREIGN PATENT DOCUMENTS

KR  10-2011-0067683 A  6/2011
KR  10-2012-0055632 A  5/2012
(Continued)

OTHER PUBLICATIONS

EP European Extended Search Report dated Jul. 1, 2024 in application 22742911.5.

*Primary Examiner* — Brian P Yenke
(74) *Attorney, Agent, or Firm* — Maschoff Brennan

(57) ABSTRACT

A device for generating a front image for heavy equipment is presented, which is configured to generate a combined front image including an object in an area obstructed by a visual field obstructing component by combining an image of a preset area in a front image of a second view to a front image of a first view. The presented device for generating a front image for heavy equipment generates a first front image and a second front image by photographing the front from the upper portion and lower portion of the heavy equipment, and generates a combined front image by combining a part of the second front image to a partial area of
(Continued)

the first front image, so that the areas thereof located at a set distance forward from the front end of the visual field obstructing component coincide with each other.

16 Claims, 15 Drawing Sheets

(51) Int. Cl.
    *G06T 15/50*     (2011.01)
    *G06T 15/60*     (2006.01)
    *H04N 23/90*     (2023.01)

(52) U.S. Cl.
    CPC ........ *H04N 23/90* (2023.01); *B60R 2300/105* (2013.01); *B60R 2300/20* (2013.01); *B60R 2300/303* (2013.01); *B60R 2300/802* (2013.01)

(58) Field of Classification Search
    CPC .... B60R 2300/802; H04N 23/90; G06T 3/40; G06T 15/503; G06T 15/60
    See application file for complete search history.

(56) References Cited

U.S. PATENT DOCUMENTS

| | | | |
|---|---|---|---|
| 11,541,827 B2 * | 1/2023 | Lee | B60R 11/04 |
| 11,833,968 B2 * | 12/2023 | Freeman-Powell | G06T 11/60 |
| 12,035,048 B2 * | 7/2024 | Park | E02F 9/261 |
| 2010/0289899 A1 | 11/2010 | Hendron et al. | |
| 2012/0134595 A1 | 5/2012 | Fonseca et al. | |
| 2014/0354813 A1 * | 12/2014 | Ishimoto | G06T 11/60 |
| | | | 348/148 |
| 2015/0331236 A1 * | 11/2015 | Roth | H04N 13/243 |
| | | | 348/48 |
| 2016/0344931 A1 | 11/2016 | Husted et al. | |
| 2018/0101736 A1 * | 4/2018 | Han | G08G 1/166 |
| 2019/0313049 A1 | 10/2019 | Greenwood et al. | |
| 2020/0086791 A1 * | 3/2020 | Hardy | G06T 3/4038 |
| 2021/0165220 A1 * | 6/2021 | Nakada | G02B 27/0101 |
| 2021/0230841 A1 | 7/2021 | Kurosawa | |
| 2022/0074171 A1 * | 3/2022 | Izumikawa | E02F 9/24 |
| 2022/0219607 A1 * | 7/2022 | Freeman-Powell | B60R 1/26 |
| 2022/0220707 A1 * | 7/2022 | Lee | E02F 9/261 |
| 2024/0328123 A1 * | 10/2024 | Lee | G06T 5/50 |

FOREIGN PATENT DOCUMENTS

| | | |
|---|---|---|
| KR | 10-2013-0069912 A | 6/2013 |
| KR | 10-1766711 B1 | 8/2017 |
| WO | 2020/080538 A1 | 4/2020 |

* cited by examiner

[Fig. 1]
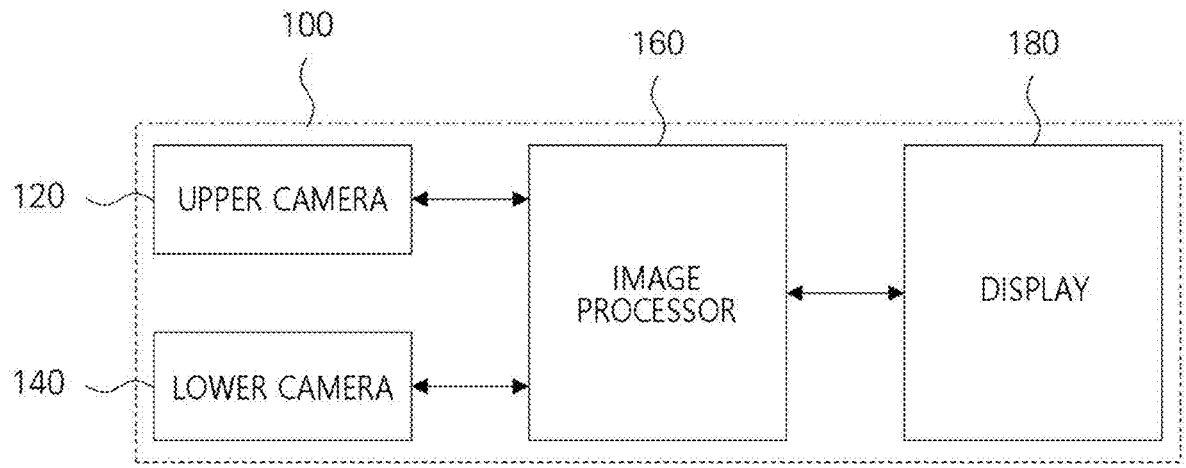
[Fig. 2]
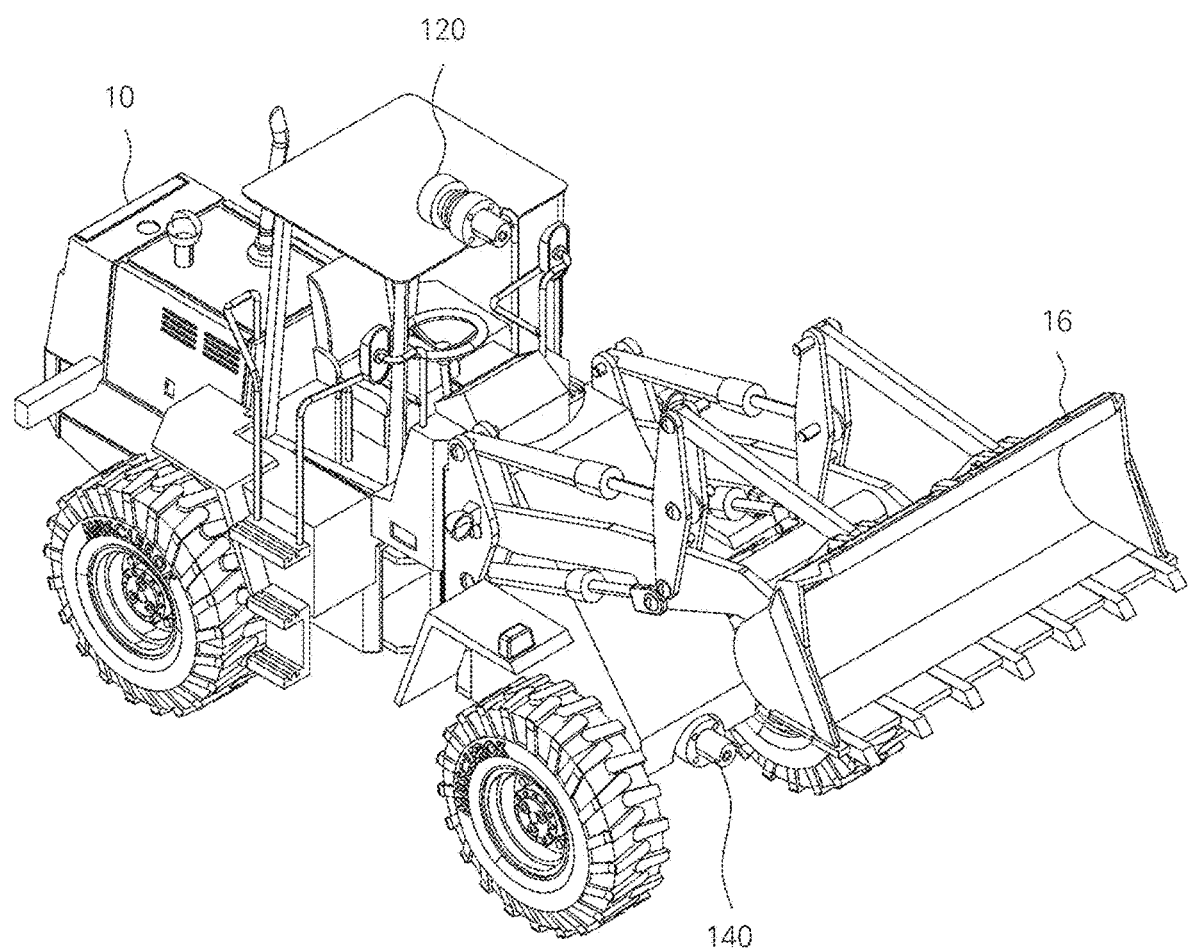

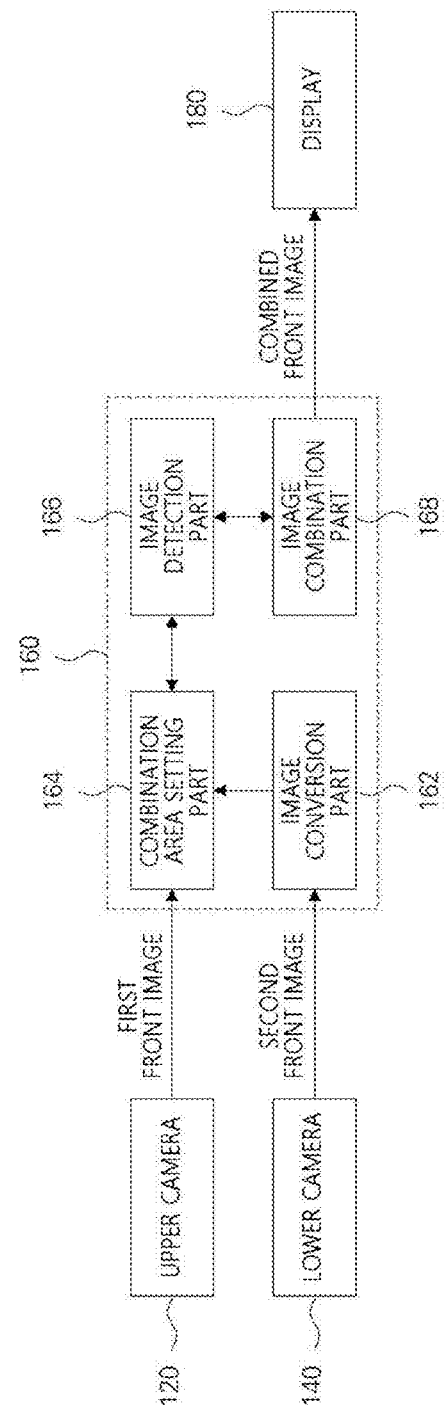
[FIG. 3]

[Fig. 4]
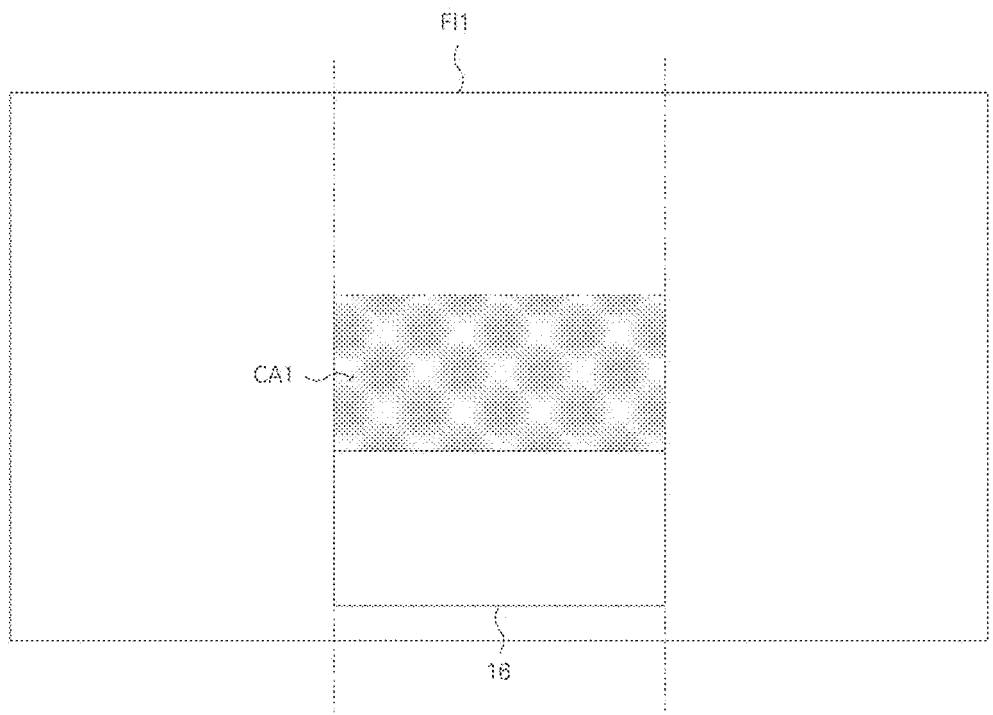
[Fig. 5]
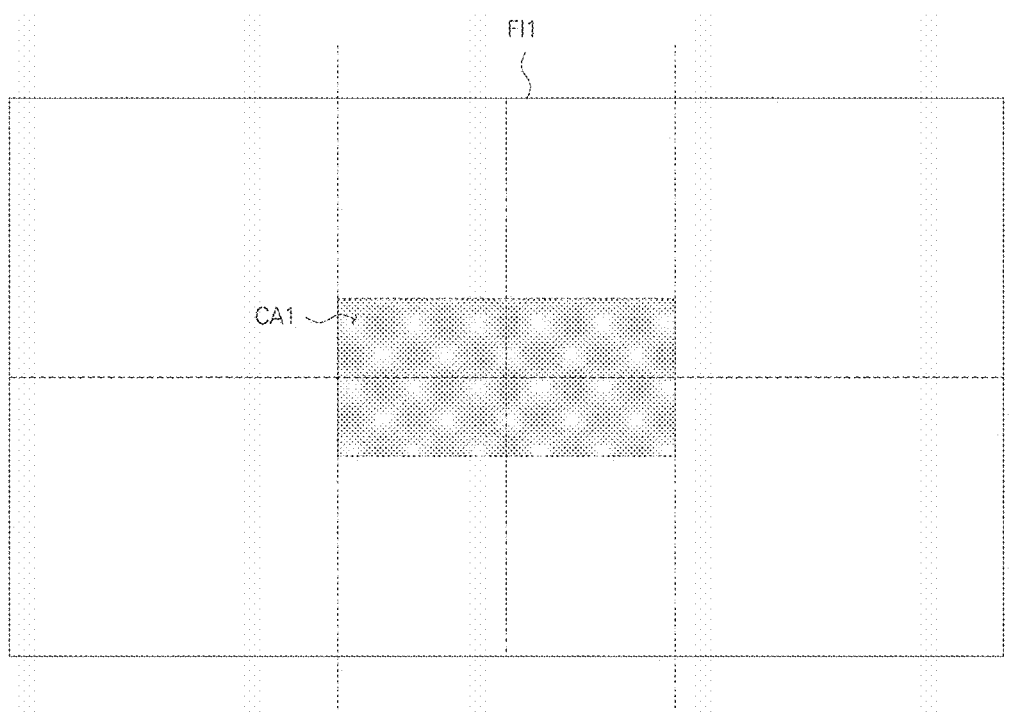

[Fig. 6]
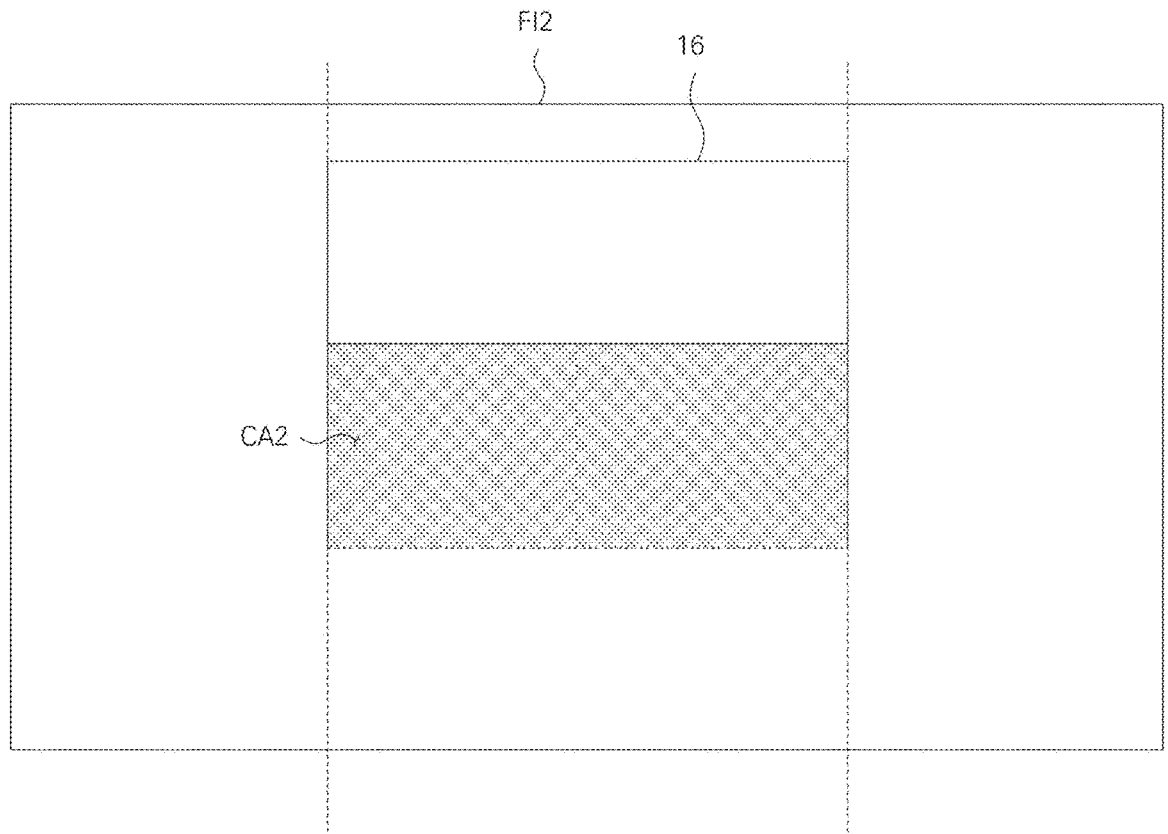
[Fig. 7]
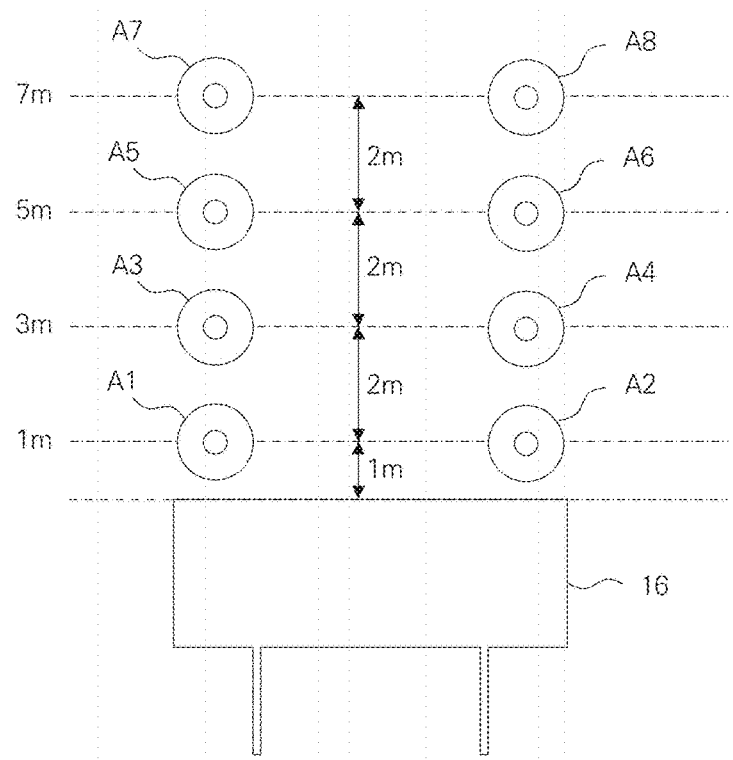

[Fig. 8]
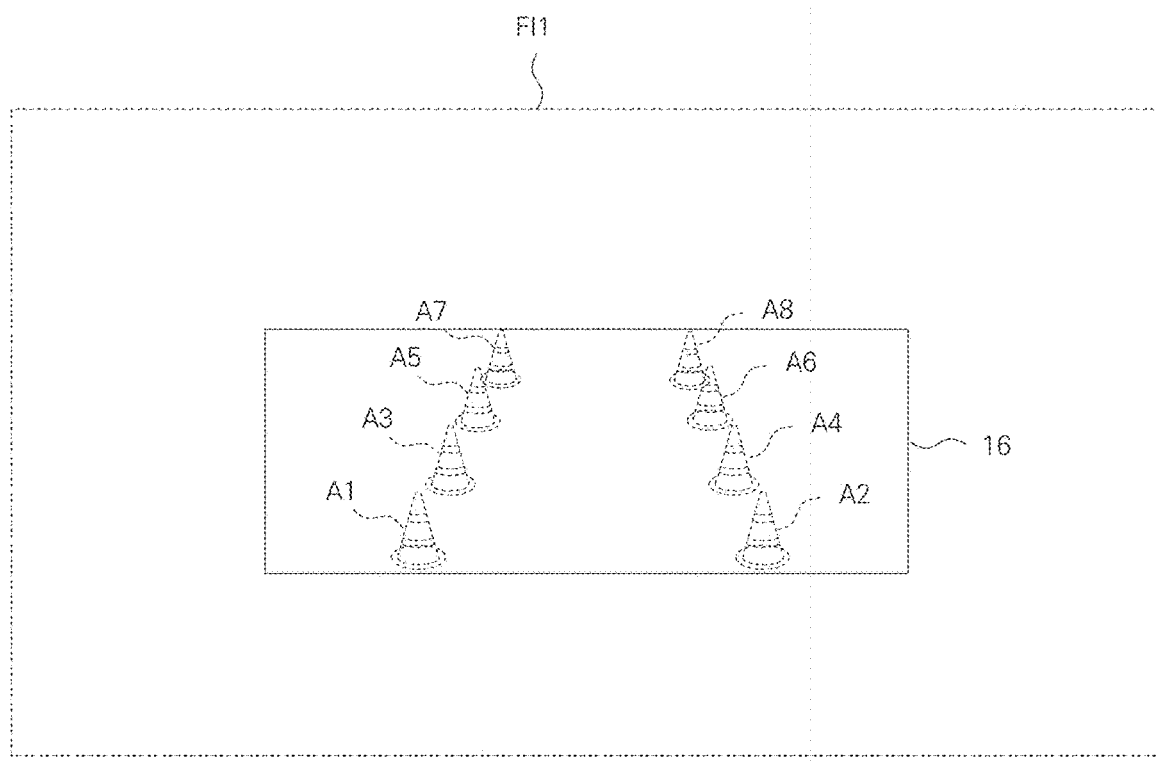
[Fig. 9]
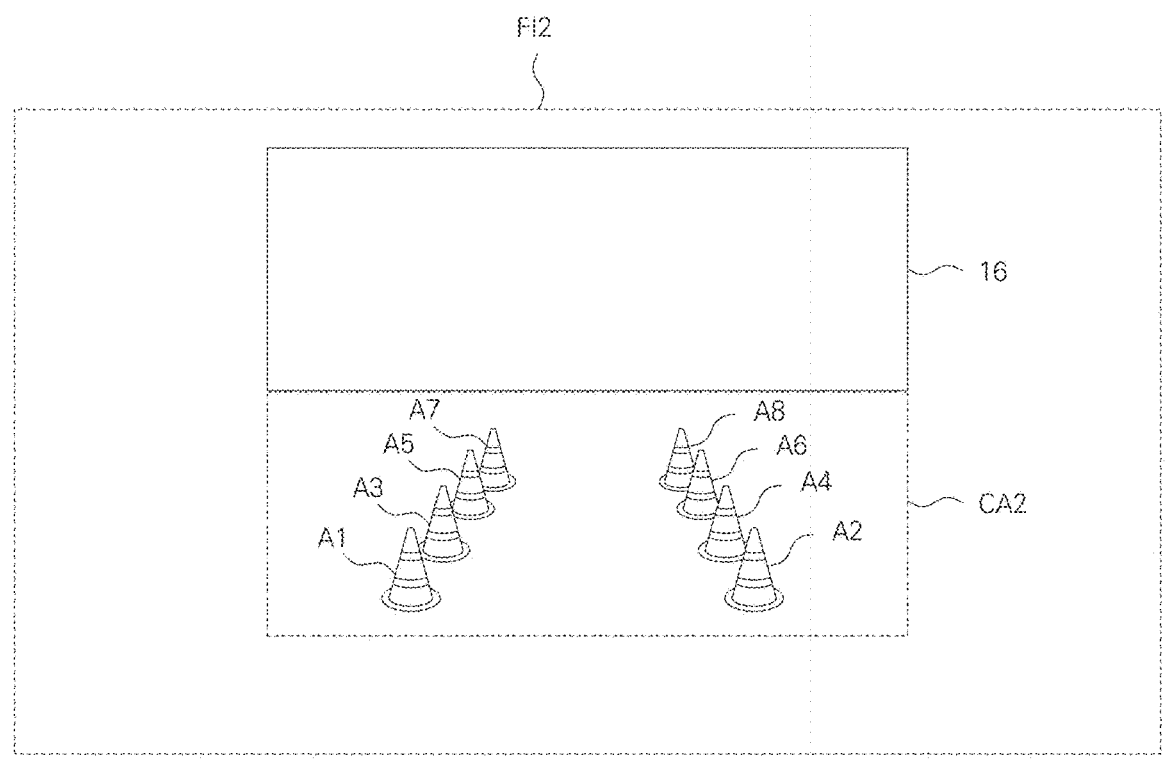

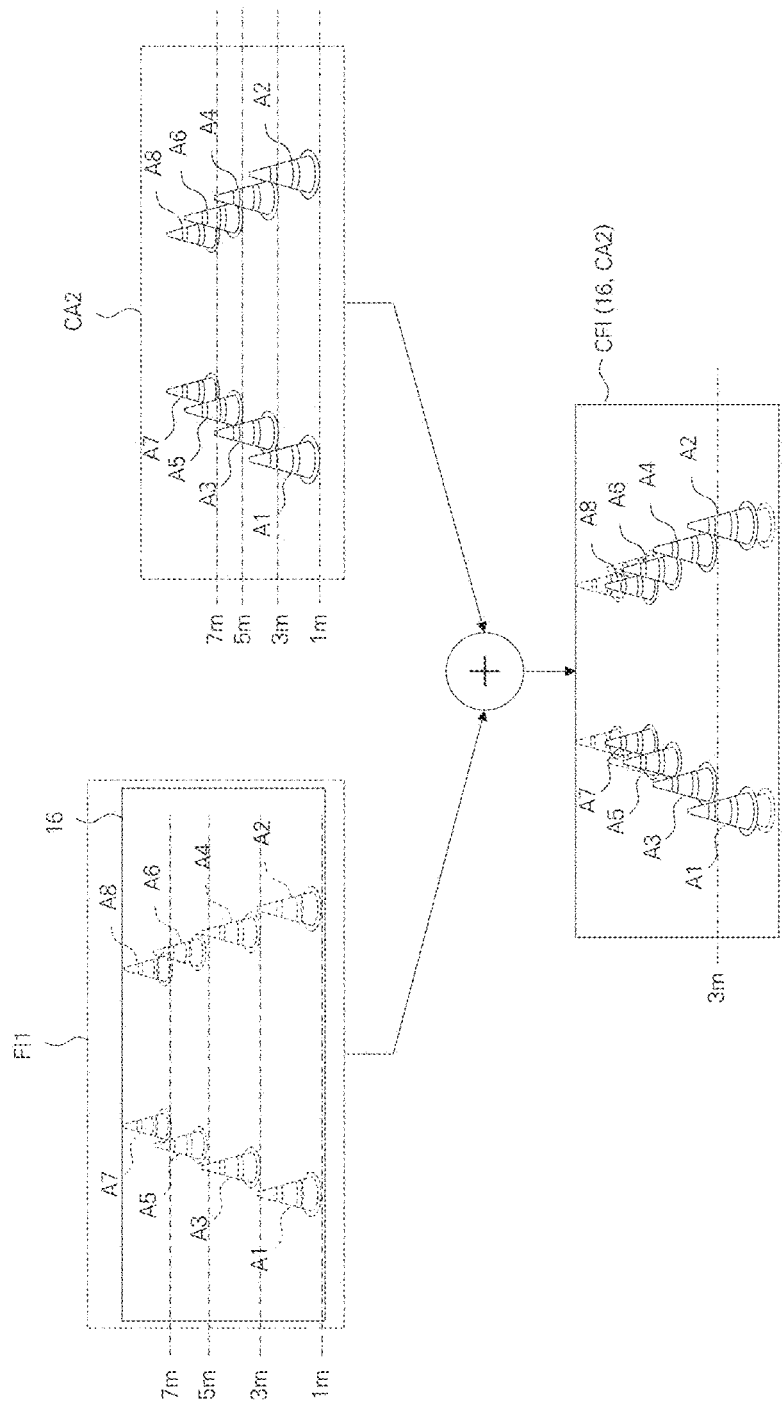
[FIG. 10]

[Fig. 11]
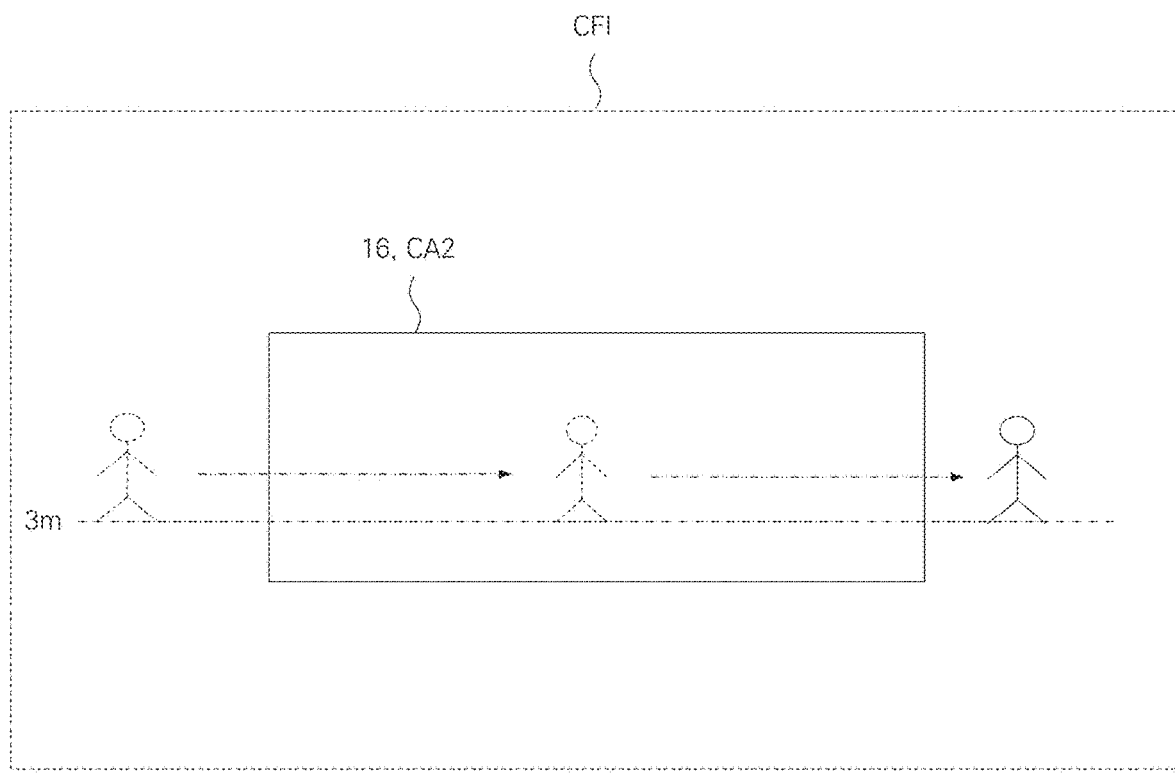

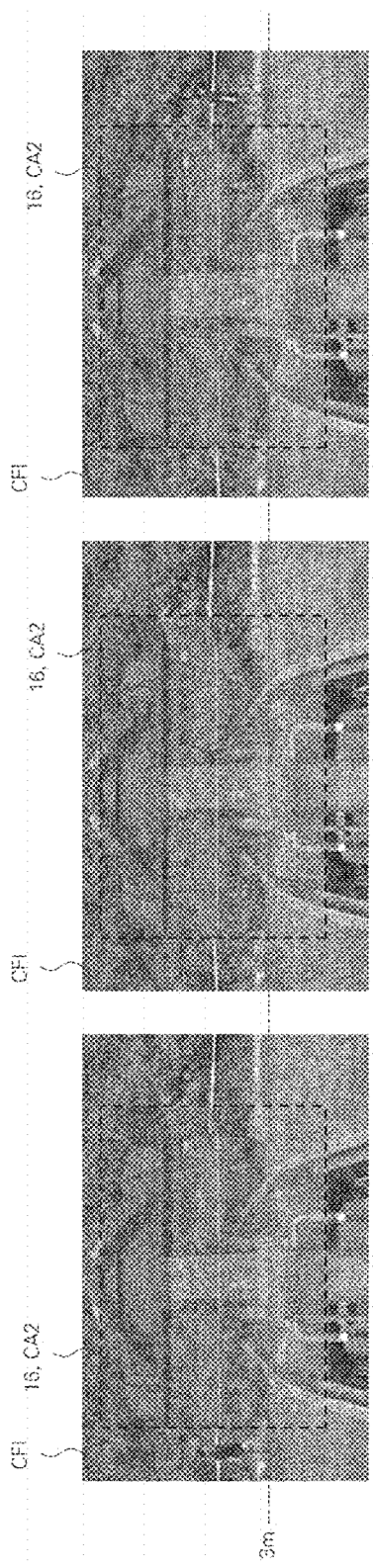
[FIG. 12]

[Fig. 13]
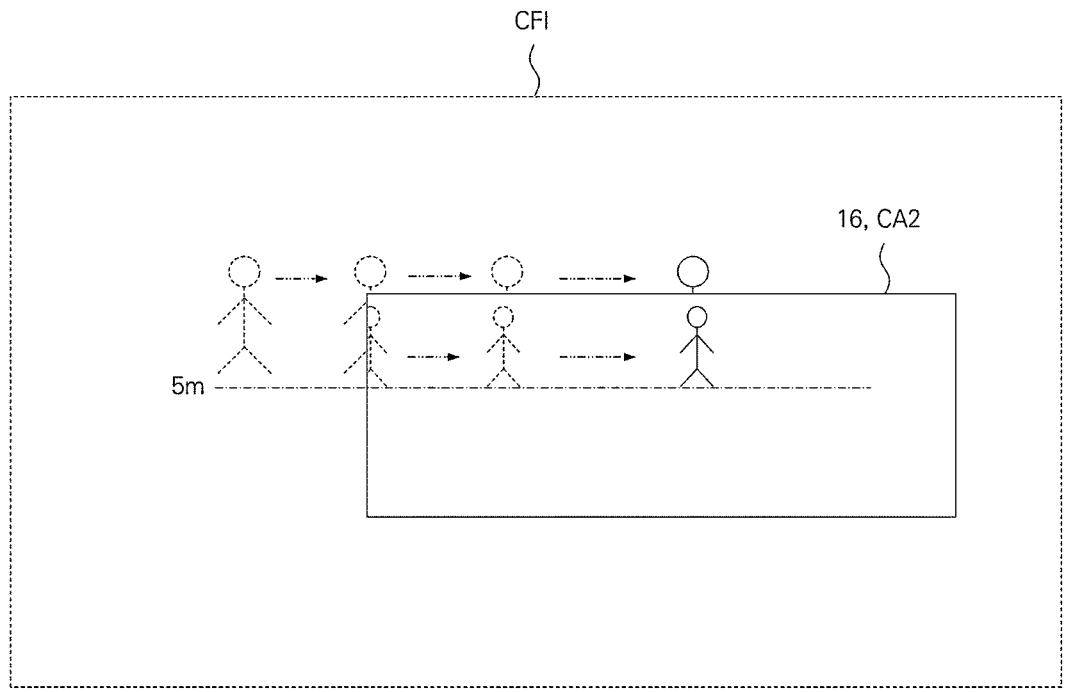
[Fig. 14]
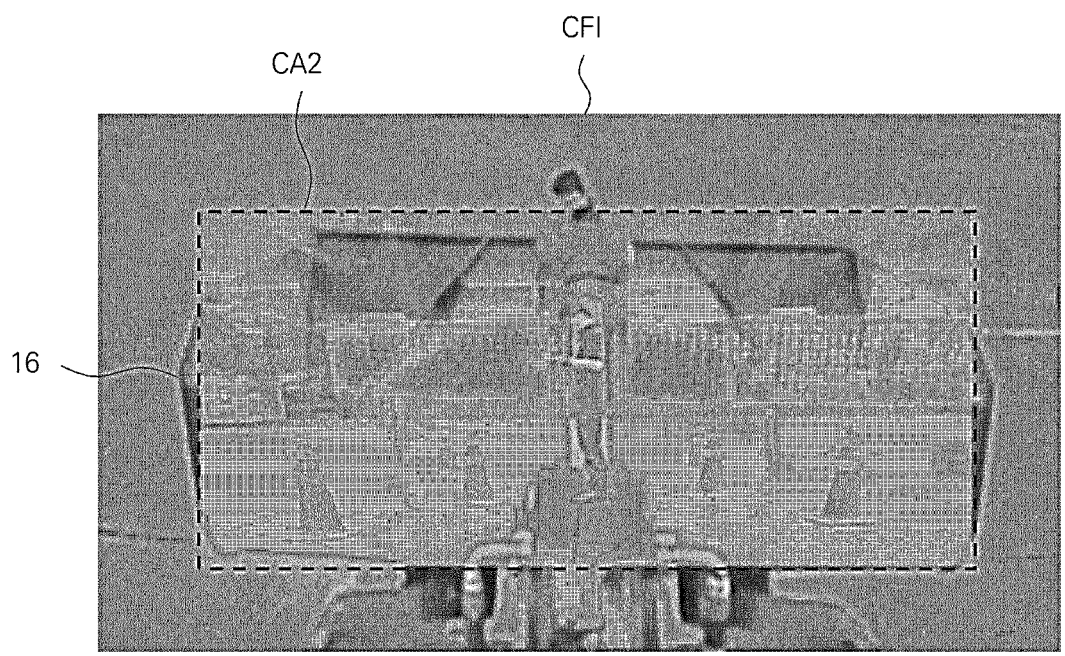

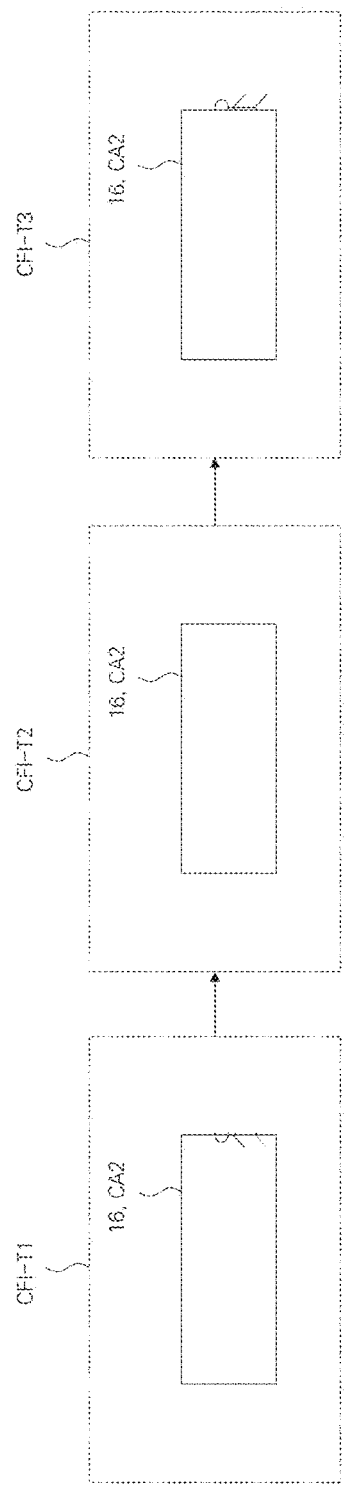
[FIG. 15]

[Fig. 16]
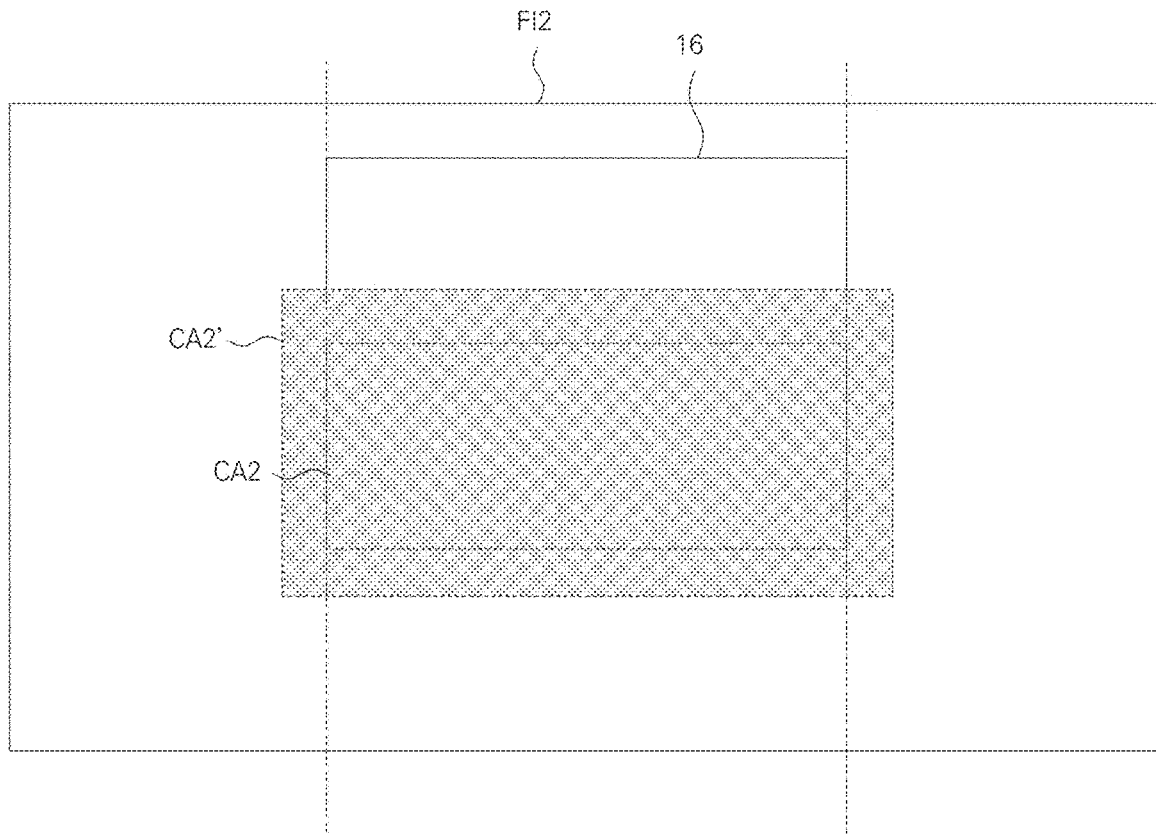
[Fig. 17]
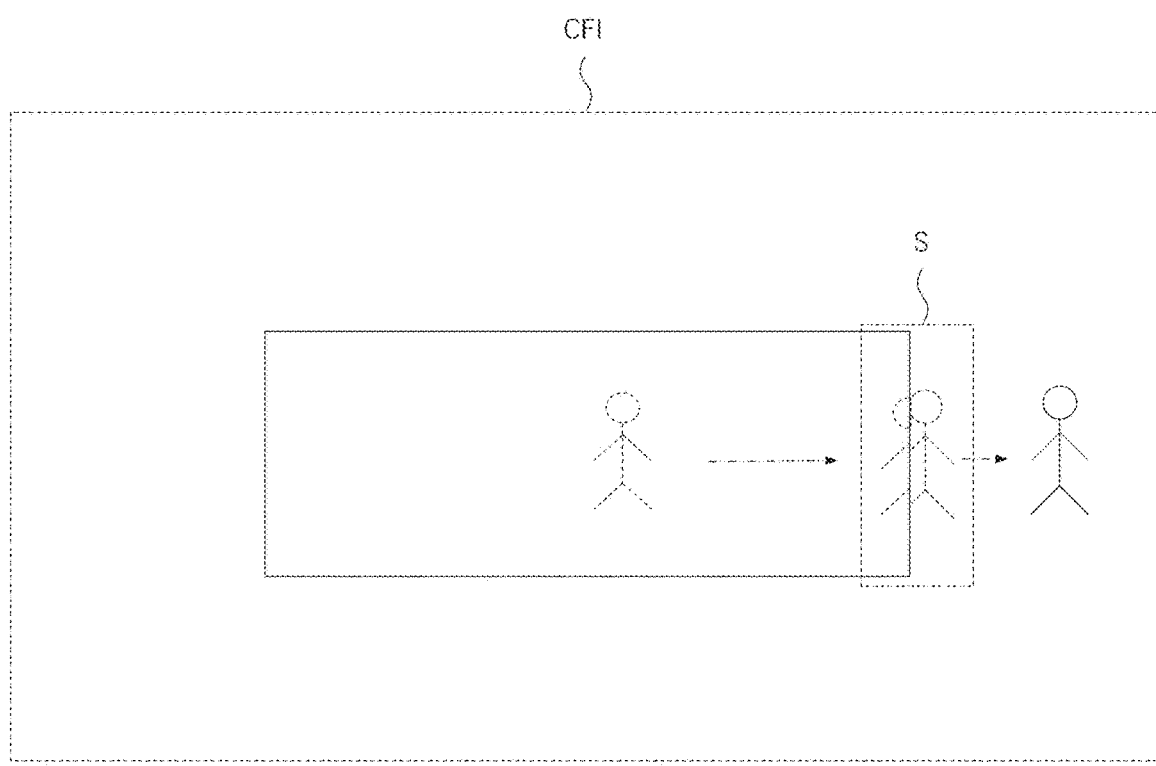

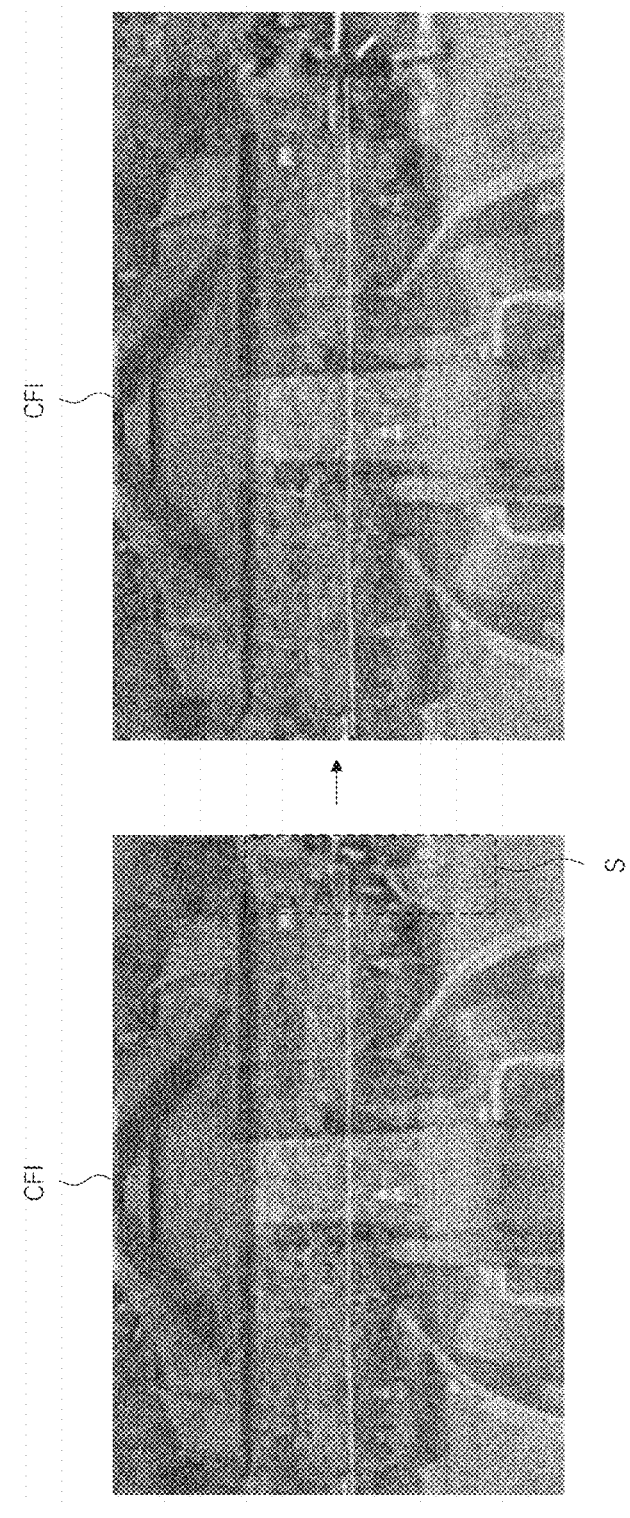
[FIG. 18]

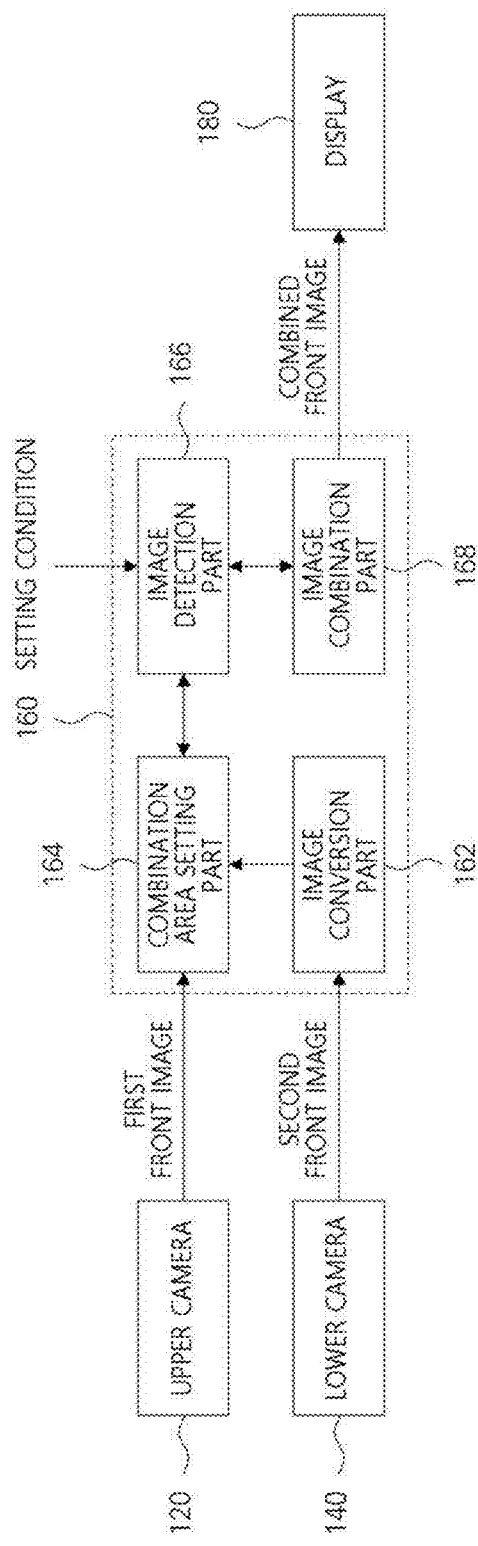
[FIG. 19]

[Fig. 20]
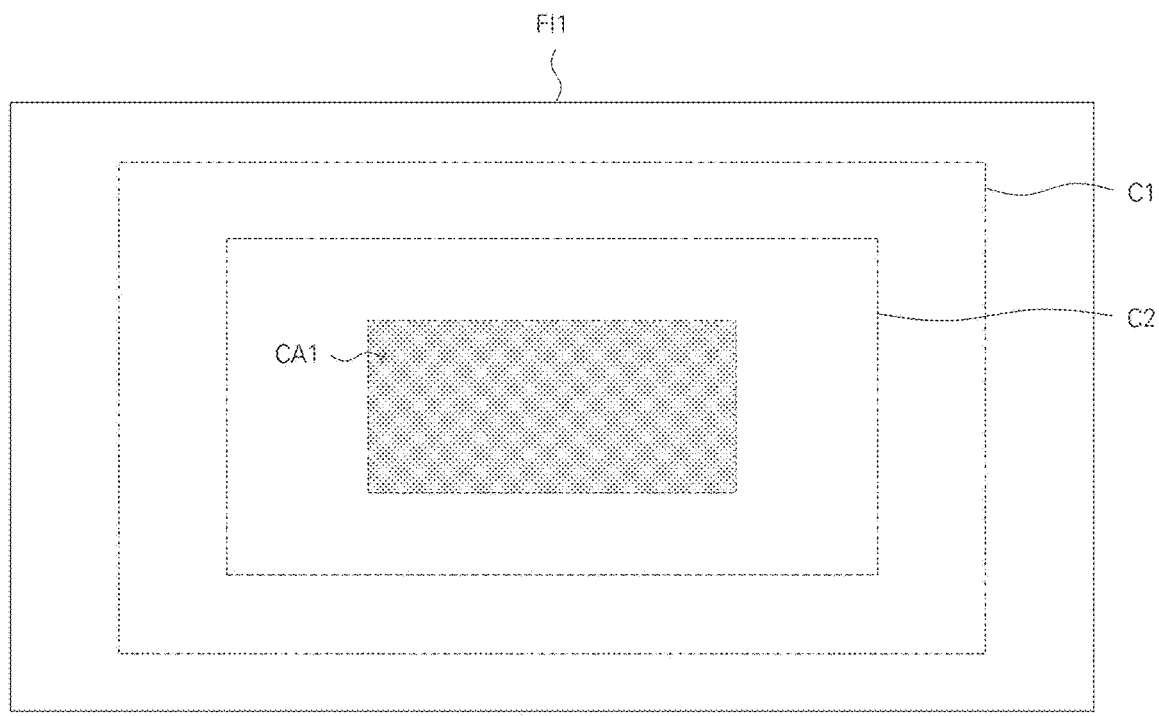
[Fig. 21]
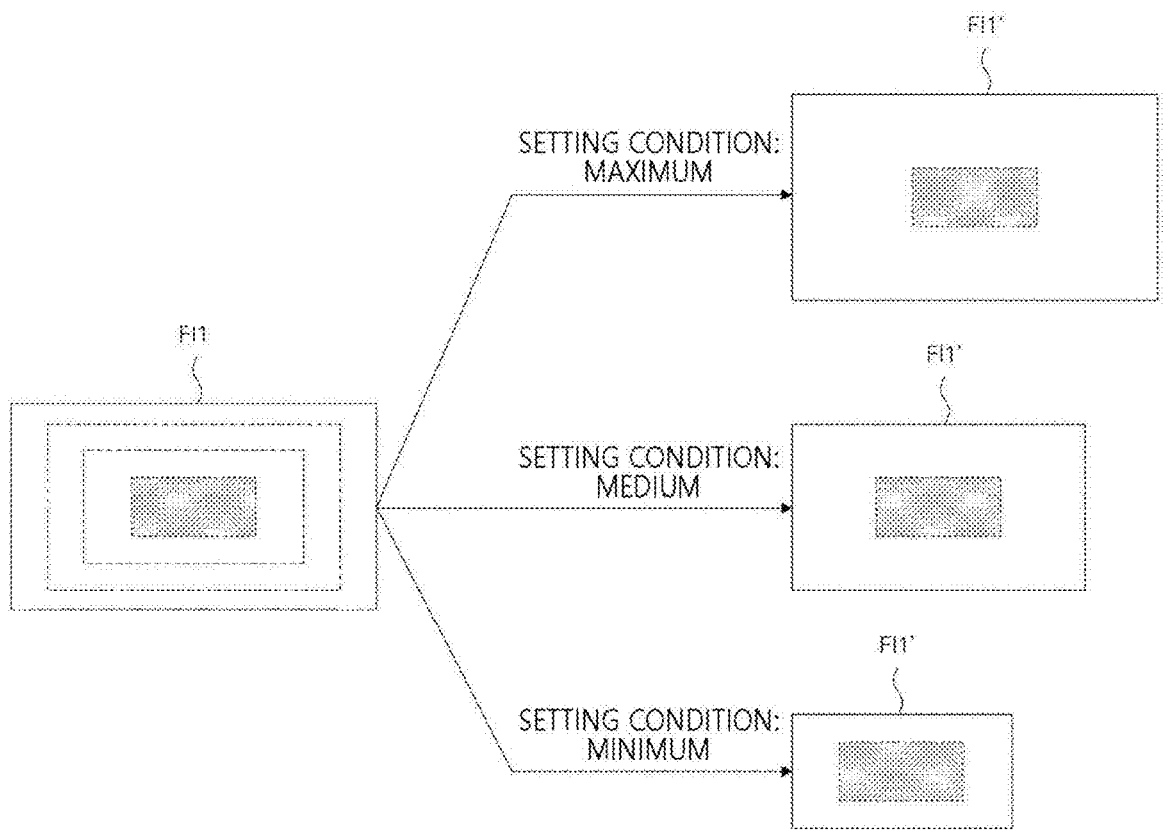

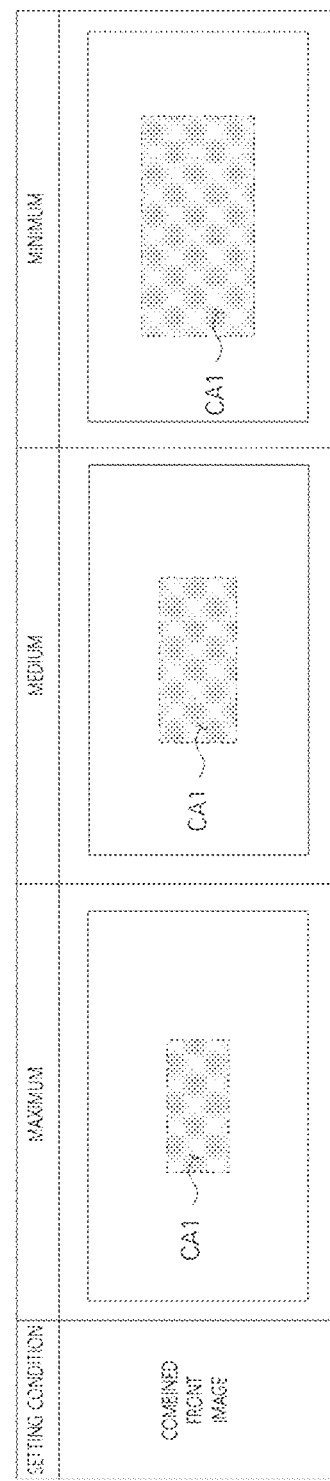
[FIG. 22]

FRONT IMAGE GENERATION DEVICE FOR HEAVY EQUIPMENT

TECHNICAL FIELD

The present disclosure relates to a device for generating a front image for heavy equipment, and more particularly, to a device for generating a front image for heavy equipment that generates a front image for securing a forward view in heavy equipment, such as a wheel loader, where it is difficult to check the front during its operation.

BACKGROUND ART

Heavy equipment is equipment used for various tasks at a construction site and the like, and examples thereof may include a wheel loader, an excavator, and the like. In this regard, since large components are often disposed in front of the driver of the heavy equipment, the forward view of the driver is obstructed by the large components during its operation. For example, the wheel loader obstructs the forward view of the driver with its bucket moving up and down in front of the driver during its operation.

Since the heavy equipment often causes the obstruction to the driver's forward view as discussed above, work efficiency is reduced, and there is a high possibility that various types of safety accidents occur.

SUMMARY OF INVENTION

Technical Problem

The present disclosure is proposed to address the above-described drawbacks of the related art, and is intended to provide a device for generating a front image for heavy equipment, which is configured to generate a combined front image including an object in an area obstructed by a visual field obstructing component by combining an image of a preset area in a front image of a second view to a front image of a first view.

Solution to Problem

In order to achieve the above object, a device for generating a front image for heavy equipment according to an embodiment of the present disclosure includes an upper camera which is disposed in an upper portion of the heavy equipment, photographs the front of the heavy equipment, and generates a first front image, a lower camera which is disposed in a lower portion of the heavy equipment, photographs the front of the heavy equipment, and generates a second front image, an image processor which sets a part of the first front image as a first combination area, a part of the second front image as a second combination area, and generates a combined front image by combining the second combination area to the first combination area of the first front image in a semi-transparent manner, wherein when an object is located at a set distance forward from a front end of a visual field obstructing component, the image processor performs the combination such that the position of the object on the vertical axis within the first combination area coincides with the position thereof on the vertical axis within the second combination area.

When the distance between the object and the front end of the visual field obstructing component is less than or greater than the set distance, the position of the object on the vertical axis within the first combination area may be different from the position thereof on the vertical axis within the second combination area.

When the distance between the object and the front end of the visual field obstructing component is less than the set distance, the position of the object on the vertical axis within the first combination area may be disposed closer to the lower portion of the combined front image than the position thereof on the vertical axis within the second combination area.

When the distance between the object and the front end of the visual field obstructing component exceeds the set distance, the position of the object on the vertical axis within the first combination area may be disposed closer to the upper portion of the combined front image than the position thereof on the vertical axis within the second combination area.

As the distance between the object and the front end of the visual field obstructing component becomes greater than the set distance, the vertical spacing between the position of the object on the vertical axis within the first combination area and the position thereof on the vertical axis within the second combination area may be further increased.

The image processor may include an image detection part which detects, as a combination image, an area set as the second combination area in the second front image, and an image combination part which generates a combined front image by combining the second combination area to the first combination area of the first front image in a semi-transparent manner, wherein when an object is located at a set distance forward from the front end of the visual field obstructing component, the image processor performs the combination such that the position of the object on the vertical axis within the first combination area coincides with the position thereof on the vertical axis within the second combination area.

The horizontal length of the first combination area may be equal to the horizontal length of the visual field obstructing component included in the first front image, and the horizontal length of the second combination area may be equal to the horizontal length of the visual field obstructing component included in the second front image.

The horizontal length of the first combination area may be equal to the horizontal length of the visual field obstructing component included in the first front image, and the horizontal length of the second combination area may be greater than the horizontal length of the visual field obstructing component included in the second front image.

The image combination part may reduce the combination image to a size corresponding to the first combination area, and combine the reduced combination image to the first combination area.

The image detection part may generate a first crop front image by cropping the first front image to a size smaller than the original size based on a setting condition, and the first crop front image may include the first combination area.

The image detection part may set a plurality of crop areas having different sizes in the first front image, and crop the first front image based on one crop area among the plurality of crop areas based on the setting condition. The image detection part may receive, as the setting condition, one of a driver's size selection information, a speed of the heavy equipment, and a distance to an object located in front of the heavy equipment.

The image detection part may enlarge the first crop front image to the original size of the first front image, and then transmit the enlarged first crop front image to the image combination part, and the image combination part may enlarge the combination image to the same size as the first combination area of the first crop front image, and then combine the enlarged combination image to the first combination area.

The image processor may further includes a combination area setting part which sets a first combination area in a shaded area in the first front image obstructed by the visual field obstructing component, and sets a second combination area in a partial area of the second front image corresponding to the first combination area, and an image conversion part which converts the second front image to a bowl shape based on an area located at a set distance forward from the front end of the visual field obstructing component in the second front images, and transmits the second front image converted to the bowl shape to the combination area setting part.

Advantageous Effects of Invention

According to the present disclosure, the device for generating a front image for heavy equipment combines a partial area of the second front image photographed at the lower portion of the heavy equipment to a partial area of the first front image photographed at the upper portion of the heavy equipment to represent the combined image, so that it has the effect of preventing the occurrence of blind spots and the obstruction of driver's forward view caused by the visual field obstructing component of the heavy equipment.

In addition, the device for generating a front image for heavy equipment combines a partial area of the second front image to a partial area of the first front image, so that it has the effect of minimizing the sense of difference of the combined front image while minimizing the amount of calculation by minimizing the combination of unnecessary objects.

Further, the device for generating a front image for heavy equipment combines the second combination area of the second front image to the first combination area of the first front image based on an area located at a set distance forward from the front end of the visual field obstructing component, so that it has the effect of minimizing the sense of difference of the combined front image in the area where many objects are located.

Furthermore, when setting the second combination area in the second front image, the device for generating a front image for heavy equipment sets a combination area larger than the size of the visual field obstructing component, so that it has the effect of preventing the occurrence of accidents during operation by preventing the occurrence of shaded areas in the combined front image where the moving object disappears.

Moreover, the device for generating a front image for heavy equipment crops and resizes the first front image FI1 according to the setting conditions and then combines a part of the second front image converted to the size of the first combination area, so that it has the effect of supporting a driver to easily check whether there are objects ahead in the various circumstances.

BRIEF DESCRIPTION OF DRAWINGS

FIG. 1 is a block diagram for explaining the configuration of a device for generating a front image for heavy equipment according to an embodiment of the present disclosure.

FIG. 2 is a diagram for explaining an upper camera and a lower camera of FIG. 1.

FIG. 3 is a diagram for explaining the image processor of FIG. 1.

FIGS. 4 and 5 are diagrams for explaining a configuration in which the combination area setting part of FIG. 3 sets a first combination area in a first front image.

FIG. 6 are diagrams for explaining a configuration in which the combination area setting part of FIG. 3 sets a second combination area in a second front image.

FIGS. 7 to 10 are diagrams for explaining an example of combining a second combination area of a second front image to a first combination area of a first front image by the image combination part of FIG. 3.

FIGS. 11 to 14 are diagrams for explaining combined front images generated by the image combination part of FIG. 3.

FIGS. 15 to 18 are diagrams for explaining a configuration in which the image combination part of FIG. 3 prevents a moving object from disappearing in a combination area of a combined front image.

FIGS. 19 to 22 are diagrams for explaining a configuration for generating a combined front image by detecting a part of a first front image according to set conditions.

DESCRIPTION OF EMBODIMENTS

Hereinafter, the most preferred embodiment of the present disclosure will be described with reference to the accompanying drawings in order to explain in detail so that those skilled in the art can easily practice the technical idea of the present disclosure. It should be noted that, when supplementing constitutional elements with reference numerals, for the like constitutional elements, even though appearing on different drawings, it is intended to make them have like reference numerals as much as possible. Additionally, it is noted that in the description of the disclosure, the detailed description for known related configurations or functions may be omitted when it is deemed that such description may obscure essential points of the disclosure.

First, the term "combination" used in the description of the embodiment of the present disclosure does not replace or overlay an image with another image, but means that both images are represented in the combinationd image by adjusting the transparency of the two images.

A device for generating a front image for heavy equipment according to an embodiment of the present disclosure generates a combined front image by combining an upper image taken from an upper camera installed in the heavy equipment and a lower image taken from a lower camera. In this case, the device for generating a front image for heavy equipment generates a combined front image in which an object obstructed by the visual field obstructing component can be checked, by combining a part of the lower image to an area of the upper image where the object is obstructed by the visual field obstructing component.

To this end, the device for generating a front image for heavy equipment sets a first combination area in the upper image, and sets a second combination area in the lower image. At this time, the device for generating a front image for heavy equipment transforms the lower image into a bowl shape in order that scales of the upper image and the lower image coincide with each other, and sets the second combination area in the transformed lower image.

The device for generating a front image for heavy equipment generates a combined front image by combining a second combination area of the lower image to a first combination area of the upper image. At this time, the device for generating a front image for heavy equipment combines the second combination area to the first combination area so that points thereof separated by a set distance from the front end of the visual field obstructing component of the heavy equipment coincide with each other.

Here, the device for generating a front image for heavy equipment generates a combined front image in which both the visual field obstructing component of the heavy equipment and the object at least partially obstructed by the visual field obstructing component can be checked, by performing the combination after adjusting the transparency of the first combination area and the transparency of the second combination area.

For example, an object located about 3 m forward from the front end of the bucket of the wheel loader is obstructed by the bucket, so it is impossible to check the object in the visual field of the driver or in the upper image, thereby increasing the risk of accidents. Because of this, the first combination area and the second combination area are combined so that points thereof approximately 3 m from the front end of the bucket of the wheel loader coincide with each other. Here, since the device for generating a front image for heavy equipment combines the second combination area to the first combination area, so that points separated by a set distance coincide with each other, it is possible to generate the combined front image in which the first object located at the set distance forward from the front end of the visual field obstructing component is represented as one object in the combined front image. Additionally, the first object represented in the combined front image is represented in the same size, and represented to be placed on the same floor surface or to move along the same floor surface, as the first object photographed by the upper camera in a state where the first object is not obstructed by the visual field obstructing component.

Meanwhile, a second object positioned farther or closer than the set distance from the front end of the visual field obstructing component is represented as two objects in the combined front image. Additionally, the second object represented in the combined front image is represented smaller or larger than the second object photographed by the upper camera in a state where the second object is not obstructed by the visual field obstructing component, and is represented to be placed on a different floor surface or to move along a different floor surface. In an example, the second object is represented in a smaller size in the combined front image as the distance from the visual field obstructing component increases.

Referring to FIG. 1, a device for generating a front image for heavy equipment 100 according to an embodiment of the present disclosure includes an upper camera 120, a lower camera 140, an image processor 160, and a display 180.

The upper camera 120 photographs the front of heavy equipment 10 to generate a first front image FI1. That is, the upper camera 120 is disposed in the upper portion of the heavy equipment 10, photographs the front of the heavy equipment 10, and generates the first front image FI1.

The lower camera 140 photographs the front of the heavy equipment 10 to generate a second front image FI2. That is, the lower camera 140 is disposed in the lower portion of the heavy equipment 10, photographs the front of the heavy equipment 10, and generates the second front image FI2.

Referring to FIG. 2, it is illustrated by way of example that the upper camera 120 is disposed at an upper portion of the driver's cab of the heavy equipment 10 and photographs the front of the heavy equipment 10 to generate the first front image FI1, while the lower camera 140 is disposed at the lower portion of the heavy equipment 10 and photographs the front of the heavy equipment 10 at a height of about 0.9 m from the ground to generate the second front image FI2.

The image processor 160 combines a partial area of the second front image FI2 photographed by the lower camera 140 with a partial area of the first front image FI1 photographed by the upper camera 120 to generate a combined front image CFI.

To this end, as shown in FIG. 3, the image processor 160 may include an image conversion part 162, a combination area setting part 164, an image detection part 166, and an image combination part 168.

The image conversion part 162 converts the second front image FI2 to a bowl shape. The image conversion part 162 converts the second front image FI2 to a bowl shape based on a position separated by a set distance from the front end of a visual field obstructing component 16 of the heavy equipment 10.

The combination area setting part 164 sets a combination area to each of the first front image FI1 and the second front image FI2 received from the upper camera 120 and the lower camera 140. At this time, the combination area setting part 164 sets a part of the first front image FI1 as a first combination area CAL based on the visual field obstructing component 16 represented in the first front image FI1, and sets a part of the second front image FI2 as a second combination area CA2 based on the visual field obstructing component 16 represented in the second front image FI2.

The combination area setting part 164 sets the horizontal length of the first combination area CA1 based on the left and right sides of the visual field obstructing component 16 represented in the first front image FI1. At this time, the combination area setting part 164 sets, as the first combination area CA1, an area including an area located at a set distance forward from the front end of the visual field obstructing component 16 of the heavy equipment 10 in the first front image FI1. Thus, the combination area setting part 164 sets, as the first combination area CA1, for example, a partial area including an area located approximately 3 m forward from the front end of the bucket 16 within the entire area of the first front image FI1.

Referring to FIG. 4, when the heavy equipment 10 is a wheel loader 10 and the rectangular first combination area CA1 is set, the combination area setting part 164 sets the first combination area CA1 having a vertical length corresponding to the height of the bucket 16 represented in the first front image FI1, with the upper end of the bucket 16 as the base, in the first front image FI1 in which the bucket 16 at its lowest position is photographed. The combination area setting part 164 sets the first combination area CA1 having the same horizontal length as the width (i.e., horizontal length) of the bucket 16, which is the visual field obstructing component 16, represented in the first front image FI1.

Referring to FIG. 5, the combination area setting part 164 may set, as the first combination area CA1, an area having the same horizontal and vertical lengths as the horizontal and vertical lengths of the bucket 16 based on the center point of the first front image FI1. At this time, the combination area setting part 164 sets the first combination area CA1 including an area located forward by a set distance.

The combination area setting part 164 sets, as the second combination area CA2, a partial area of the second front image FI2 converted to the bowl shape by the image conversion part 162. The combination area setting part 164 sets the second combination area CA2 so that the left and right sides thereof substantially coincide with those of the first combination area CA1.

For example, referring to FIG. 6, the combination area setting part 164 sets the horizontal length of the second combination area CA2 based on the left and right sides of the visual field obstructing component 16 represented in the second front image FI2. The combination area setting part 164 may set the vertical length of the second combination area CA2 based on the ratio of the horizontal length of the first combination area CA1 and the horizontal length of the second combination area CA2. At this time, the combination area setting part 164 sets a second combination area CA2 including an area located at a set distance forward from the front end of the visual field obstructing component 16.

The combination area setting part 164 may set, as the second combination area CA2, an area having the same horizontal and vertical lengths as the horizontal and vertical lengths of the bucket 16 based on the center point of the second front image FI2. At this time, the combination area setting part 164 sets the second combination area CA2 including an area located forward by a set distance.

The combination area setting part 164 operates only at the time of manufacture or initial driving to set the first combination area CAL and the second combination area CA2, and sets preset areas as the combination areas for images inputted thereafter.

The image detection part 166 detects, from the second front image FI2, a combination area to be combined to the first front image FI1. The image detection part 166 detects, as the combination image, an area set as the second combination area CA2 in the second front image FI2.

The image combination part 168 generates a combined front image CFI by combining the combination image detected from the second front image FI2 to the first front image FI1. The image combination part 168 reduces (or enlarges) the combination image to convert it to the same size as the first combination area CA1. The image combination part 168 adjusts the transparency of the first combination area CA1 of the first front image FI1 and the combination image, and then combines the combination image to the first combination area CAL of the first front image FI1 to generate the combined front image CFI.

The image combination part 168 combines the first front image FI1 and the combination image so that areas located at the set distance forward from the front end of the visual field obstructing component 16 coincide with each other. At this time, the image combination part 168 combines the first front image FI1 and the combination image based on the set distance, so that the bottom surfaces of objects located forward by the set distance are represented to coincide with each other in the combined front image CFI.

In other words, when the object is located at the set distance forward from the front end of the visual field obstructing component 16, the image combination part 168 combines the first front image FI1 and the combination image, so that the position of the object on the vertical axis within the first combination area CAL coincides with the position thereof on the vertical axis within the second combination area CA2.

In contrast, when the distance between the object and the front end of the visual field obstructing component 16 is less than or greater than the set distance, the position of the object on the vertical axis within the first combination area CAL may be different from the position thereof on the vertical axis within the second combination area CA2.

When the distance between the object and the front end of the visual field obstructing component 16 is less than the set distance, the position of the object on the vertical axis within the first combination area CA1 may be disposed closer to the lower portion of the combined front image than the position thereof on the vertical axis within the second combination area CA2.

When the distance between the object and the front end of the visual field obstructing component 16 exceeds the set distance, the position of the object on the vertical axis within the first combination area CA1 may be disposed closer to the upper portion of the combined front image than the position thereof on the vertical axis within the second combination area CA2. At this time, as the distance between the object and the front end of the visual field obstructing component 16 increases, the vertical spacing between the position of the object on the vertical axis within the first combination area CA1 and the position thereof on the vertical axis within the second combination area CA2 may be further increased.

In an example, referring to FIG. 7, it is assumed that from the front end of the bucket 16 of the wheel loader 10, a first cone A1 and a second cone A2 are disposed 1 m ahead; a third cone A3 and a fourth cone A4, disposed 3 m ahead; a fifth cone A5 and a sixth cone A6, disposed 5 m ahead; and a seventh cone A7 and an eighth cone A8, disposed 7 m ahead.

Referring to FIG. 8, as the bucket 16 of the wheel loader 10 rises, in the first front image FI1 photographed by the upper camera 120, portions the upper ends of the first and second cones A1 and A2, and portions of the lower ends of the third to sixth cones, and portions of the lower ends of the seventh and eighth cones A7 and A8 are obstructed by the bucket 16.

Referring to FIG. 9, as the bucket 16 of the wheel loader 10 rises, in the second front image FI2 photographed by the lower camera 140, the first cone A1 to the eighth cone A8 become all visible without being obstructed by the bucket 16. The image detection part 166 detects the combination image from the second front image FI2, and the combination image includes the first cone A1 to the eighth cone A8.

Referring to FIG. 10, the image combination part 168 combines the combination image to the first front image FI1 based on a set distance of 3 m. That is, the image combination part 168 combines the combination image to the first combination area CA1 of the first front image FI1, so that the bottom surfaces of the third and fourth cones A3 and A4 included in the combination image (that is, positions on the vertical axis on the screen) coincide with the bottom surfaces (that is, the positions on the vertical axis on the screen) corresponding to 3 m ahead in the first combination area CA1 of the first front image FI1.

Thus, the third cone A3 and the fourth cone A4 represented on the combined front image CFI are represented at positions where the third cone A3 and fourth cone A4 located at a set distance of 3 m forward coincide with the bottom surface (i.e., the position on the vertical axis on the screen). In this case, the first cone A1, the second cone A2, the fifth cone A5, the sixth cone A6, the seventh cone A7, and the eighth cone A8 represented in the combined front image CFI are represented at positions where they do not coincide with the bottom surface (i.e., the position on the vertical axis on the screen).

Here, in FIG. 10, since the state in which the first cone A1 to the eighth cone A8 are completely obstructed by the visual field obstructing component 16 in the first front image FI1 is taken as an example, it is shown that the first cone A1 to eighth cone A8 of the first front image FI1 are not represented in the combined front image CFI, and only the first cone A1 to eighth cone A8 are represented in the second front image FI2.

At this time, when some or all of the first cone A1 to eighth cone A8 in the first front image FI1 are not obstructed by the visual field obstructing component 16, the first cone A1 to eighth cone A8 of the first front image FI1 in the combined front image CFI and the first cone A1 to eighth cone A8 in the second front image FI2 can be all represented.

The image combination part 168 may adjust the size and position of the combination image to achieve coincidence with the size of an object located forward by the set distance, and then combine the same to the first front image FI1.

Since the image combination part 168 generates the combined front image CFI based on the set distance, in the case of a large object such as a person, an object photographed in the first front image FI1 and an object photographed in the second front image FI2 may be represented to be overlapped with each other within the combined front image CFI.

Referring to FIGS. 11 and 12, when it is assumed that a person moves 3 m ahead based on the front end of the bucket 16 of the wheel loader 10, and when the person moves outside the first combination area CA1 in the combined front image CFI, the person photographed by the upper camera 120 is represented. When the person moves from right to left on the drawing and the person moves in the first combination area CA1, the person photographed by the lower camera 140 is represented.

When the person moves outside the first combination area CA1 in the combined front image CFI, the person photographed by the upper camera 120 is represented.

Accordingly, the size of the person in the first combination area CA1 is reduced, but the position on the ground where the person is moving is maintained the same as when it is photographed by the upper camera 120.

Referring to FIGS. 13 and 14, when it is assumed that a person moves 5 m ahead based on the front end of the bucket 16 of the wheel loader 10, and when the person moves outside the first combination area CAL in the combined front image CFI, the person photographed by the upper camera 120 is represented. When the person moves from right to left on the drawing and the person moves in the first combination area CA1, the person photographed by the upper camera 120 and the person photographed by the lower camera 140 are represented together. Accordingly, the same person is represented as two people in the first combination area CA1, and their locations on the ground are also represented differently.

Meanwhile, referring to FIG. 15, when a second combination area CA2 having the same horizontal length as the bucket 16 is set in the combination area setting part 164, the moving object moves (CFI-T1, CIF-T2, CIF-T3), the moving object may not be represented in the combined front image CFI-T2. In this case, an accident may occur during the operation because the driver of the heavy equipment 10 cannot check the moving object.

In order to prevent this, as shown in FIG. 16, when setting the second combination area CA2 in the second front image FI2, the combination area setting part 164 may set a second combination area CA2' having a horizontal length and/or a vertical length greater than that of the bucket 16 represented in the second combination area CA2.

The image combination part 168 combines the combination image to the first front image FI1 based on the set distance, but this combination is performed after reducing the combination image according to the size of the first combination area CA1 of the first front image FI1.

At this time, referring to FIGS. 17 and 18, in the combined front image CFI, a section S in which the moving object is double-represented may occur in the left and right sides of the combination area (i.e., the first combination area CA1) of the combined front image CFI. However, since the moving body is represented on the combined front image CFI until it leaves the shaded area of the bucket 16, the device for generating a front image for heavy equipment 100 according to an embodiment of the present disclosure can prevent accidents during operation.

Through this, the device for generating a front image for heavy equipment 100 according to an embodiment of the present disclosure can represent the moving object on the combined front image CFI until the moving object completely leaves the danger zone, and through this, can prevent accidents during operation of the heavy equipment 10.

Meanwhile, the device for generating a front image for heavy equipment 100 according to an embodiment of the present disclosure may generate a combined front image CFI by using a partial area of the first front image FI1 according to setting conditions.

Referring to FIG. 19, when setting conditions are input, the image detection part 166 crops the first front image FI1 before combining the first front image FI1 and the combination image. The image conversion part 162 crops the first front image FI1 to include the first combination area CA1.

The image detection part 166 presets a plurality of crop areas smaller than the original size based on the original size of the first front image FI1. In an example, referring to FIG. 20, the image detection part 166 may set a first crop area C1 smaller than the original size and a second crop area C2 smaller than the first crop area C1 in the first front image FI1.

The image detection part 166 may receive, as a setting condition, one of the driver's size selection, the speed of the heavy equipment 10, and the distance from an obstacle. The image detection part 166 crops the first front image FI1 according to the inputted setting condition to generate a first cropped front image FI1'.

In an example, referring to FIG. 21, when "maximum" is inputted as a setting condition, the image detection part 166 generates a first crop front image FI1' of the original size without cropping the first front image FI1.

When the input setting condition is "medium", the image detection part 166 crops the first front image FI1 based on the first crop area C1 to generate a first crop front image FI1' smaller than the original size.

When the input setting condition is "minimum", the image detection part 166 crops the first front image FI1 based on the second crop area C2 to generate a first crop front image FI1' smaller than the original size.

The image detection part 166 converts the size of the first crop front image FI1' to the original size of the first front image FI1, and transmits the converted image to the image combination part 168.

The image detection part 166 converts the size of the first crop front image FI1' to the original size of the first front image FI1, and then transmits the converted image to the image combination part 168. At this time, as the size of the first crop front image FI1' is converted, the size of the first combination area CA1 is also converted at the same ratio as that of the first crop front image FI1'.

The image combination part 168 combines the combination image detected by the image detection part 166 to the first combination area CAL of the first crop front image FI1' to generate the combined front image CFI. At this time, the image combination part 168 converts the size of the combination image to the size of the first combination area CA1, and then combines the converted image to the first crop front image FI1'.

Referring to FIG. 22, when the setting condition is maximum, the image combination part 168 uses the combination area as it is for the combination because there is no change in the size of the first combination area CA1. Since the size of the first combination area CA1 increases when the setting condition is medium or minimum, the image combination part 168 converts the combination area to the increased size of the first combination area CA1, and then perform the combination. In this way, the image combination part 168 generates the combined front image CFI in which the size of the area where the combination image is combined (i.e., the first combination area CA1) is changed according to the setting conditions.

As such, the device for generating a front image for heavy equipment 100 according to an embodiment of the present disclosure crops and resizes the first front image FI1 according to the setting conditions and then combines a part of the second front image FI2, thereby supporting a driver to easily check whether there are objects ahead.

The display 180 represents the combined front image CFI combined by the image processor 160. The display 180 is disposed on a driver's seat or a remote control device of the heavy equipment 10, and receives and represents the combined front image CFI from the image processor 160.

In the above, although the description is made under the assumption that the construction equipment is the wheel loader 10 in order to easily explain the embodiments of the present disclosure, it is not limited thereto, and may be applied to construction equipment such as an excavator or a forklift, in which a blind spot occurs in the front due to the visual filed obstructing component 16 during operation.

In addition, as the wheel loader 10 is described as an example, the bucket 16 of the wheel loader 10 has been described as the visual field obstructing component 16, but it is not limited thereto, the visual field obstructing component 16 may be a component that obstructs a front vision, such as a bucket 16, bucket 16 boom, bucket 16 cylinder or the like of an excavator, a mast, lift chain, carriage, fork arm, fork or the like of a forklift, or the like.

Although the preferred embodiments according to the present disclosure have been described above, it will be understood that modifications can be made in various forms, and those skilled in the art can make various modifications and modifications without departing from the scope of the claims of the present disclosure.

The invention claimed is:

1. A device for generating a front image for heavy equipment with a blind spot occurring in a front due to a visual field obstructing component, the device comprising:
   an upper camera which is disposed in an upper portion of the heavy equipment, photographs the front of the heavy equipment, and generates a first front image;
   a lower camera which is disposed in a lower portion of the heavy equipment, photographs the front of the heavy equipment, and generates a second front image;
   an image processor which sets a part of the first front image as a first combination area, a part of the second front image as a second combination area, and generates a combined front image by combining the second combination area to the first combination area of the first front image in a semi-transparent manner, wherein when an object is located at a set distance forward from a front end of a visual field obstructing component, the image processor performs the combination such that the position of the object on the vertical axis within the first combination area coincides with the position thereof on the vertical axis within the second combination area.

2. The device for generating a front image for heavy equipment according to claim 1, wherein when a distance between the object and the front end of the visual field obstructing component is less than or greater than the set distance, the position of the object on the vertical axis within the first combination area is different from the position thereof on the vertical axis within the second combination area.

3. The device for generating a front image for heavy equipment according to claim 1, wherein when a distance between the object and the front end of the visual field obstructing component is less than the set distance, the position of the object on the vertical axis within the first combination area is disposed closer to the lower portion of the combined front image than the position thereof on the vertical axis within the second combination area.

4. The device for generating a front image for heavy equipment according to claim 1, wherein when a distance between the object and the front end of the visual field obstructing component is greater than the set distance, the position of the object on the vertical axis within the first combination area is disposed closer to the upper portion of the combined front image than the position thereof on the vertical axis within the second combination area.

5. The device for generating a front image for heavy equipment according to claim 1, wherein as a distance between the object and the front end of the visual field obstructing component becomes greater than the set distance, a vertical spacing between the position of the object on the vertical axis within the first combination area and the position thereof on the vertical axis within the second combination area is further increased.

6. The device for generating a front image for heavy equipment according to claim 1, wherein the image processor includes:
   an image detection part which detects, as a combination image, an area set as the second combination area in the second front image; and
   an image combination part which generates a combined front image by combining the second combination area to the first combination area of the first front image in a semi-transparent manner, wherein when an object is located at a set distance forward from the front end of the visual field obstructing component, the image processor performs the combination such that the position of the object on the vertical axis within the first combination area coincides with the position thereof on the vertical axis within the second combination area.

7. The device for generating a front image for heavy equipment according to claim 6, wherein the horizontal length of the first combination area is equal to the horizontal length of the visual field obstructing component included in the first front image, and
   wherein the horizontal length of the second combination area is equal to the horizontal length of the visual field obstructing component included in the second front image.

8. The device for generating a front image for heavy equipment according to claim 6, wherein the horizontal length of the first combination area is equal to the horizontal length of the visual field obstructing component included in the first front image, and wherein the horizontal length of the second combination area is greater than the horizontal length of the visual field obstructing component included in the second front image.

9. The device for generating a front image for heavy equipment according to claim 8, wherein the image combination part reduces the combination image to a size corresponding to the first combination area, and combines the reduced combination image to the first combination area.

10. The device for generating a front image for heavy equipment according to claim 6, wherein the image detection part generates a first crop front image by cropping the first front image to a size smaller than the original size based on a setting condition, and the first crop front image includes the first combination area.

11. The device for generating a front image for heavy equipment according to claim 10, wherein the image detection part sets a plurality of crop areas having different sizes in the first front image, and crops the first front image based on one crop area among the plurality of crop areas based on the setting condition.

12. The device for generating a front image for heavy equipment according to claim 10, wherein the image detection part receives, as the setting condition, one of a driver's size selection information, a speed of the heavy equipment, and a distance to an object located in front of the heavy equipment.

13. The device for generating a front image for heavy equipment according to claim 10, wherein the image detection part enlarges the first crop front image to the original size of the first front image, and then transmits the enlarged first crop front image to the image combination part.

14. The device for generating a front image for heavy equipment according to claim 13, wherein the image combination part enlarges the combination image to the same size as the first combination area of the first crop front image, and then combines the enlarged combination image to the first combination area.

15. The device for generating a front image for heavy equipment according to claim 6, wherein the image processor further includes a combination area setting part which sets a first combination area in a shaded area in the first front image obstructed by the visual field obstructing component, and sets a second combination area in a partial area of the second front image corresponding to the first combination area.

16. The device for generating a front image for heavy equipment according to claim 15, wherein the image processor further includes an image conversion part which converts the second front image to a bowl shape based on an area located at a set distance forward from the front end of the visual field obstructing component in the second front images, and transmits the second front image converted to the bowl shape to the combination area setting part.

* * * * *